US008750563B2

(12) United States Patent
Stegeman et al.

(10) Patent No.: US 8,750,563 B2
(45) Date of Patent: Jun. 10, 2014

(54) METHOD AND APPARATUS FOR PREPARING MAIL PIECES

(75) Inventors: William Hendrik Stegeman, Holten (NL); Jurek Nicolaj Deen, Zwolle (NL)

(73) Assignee: Neopost Technologies, Bagneux (FR)

( * ) Notice: Subject to any disclaimer, the term of this patent is extended or adjusted under 35 U.S.C. 154(b) by 1130 days.

(21) Appl. No.: 12/702,559

(22) Filed: Feb. 9, 2010

(65) Prior Publication Data

US 2010/0202655 A1 Aug. 12, 2010

(30) Foreign Application Priority Data

Feb. 9, 2009 (EP) .................................... 09152408

(51) Int. Cl.
*G06K 9/00* (2006.01)

(52) U.S. Cl.
USPC ............................ 382/101; 209/584; 705/401

(58) Field of Classification Search
USPC .................. 382/100, 101, 321; 705/400, 401; 700/215, 223; 209/540, 584, 656; 235/454
See application file for complete search history.

(56) References Cited

U.S. PATENT DOCUMENTS

| | | | | |
|---|---|---|---|---|
| 2002/0070149 | A1 * | 6/2002 | Schererz et al. | 209/540 |
| 2002/0122569 | A1 * | 9/2002 | Coffelt et al. | 382/101 |
| 2002/0172399 | A1 * | 11/2002 | Poulin et al. | 382/101 |
| 2003/0038065 | A1 * | 2/2003 | Pippin et al. | 209/584 |
| 2003/0138129 | A1 * | 7/2003 | Olson et al. | 382/101 |
| 2004/0059462 | A1 * | 3/2004 | Norris et al. | 700/223 |
| 2005/0008265 | A1 * | 1/2005 | Cykana et al. | 382/321 |
| 2005/0025340 | A1 * | 2/2005 | Hickman | 382/101 |
| 2006/0030969 | A1 * | 2/2006 | Norris et al. | 700/215 |
| 2006/0102530 | A1 * | 5/2006 | Karnin et al. | 209/584 |
| 2006/0173898 | A1 * | 8/2006 | Hanson | 707/102 |
| 2006/0212304 | A1 * | 9/2006 | Krause | 705/1 |
| 2007/0017854 | A1 * | 1/2007 | Quine et al. | 209/552 |
| 2008/0060980 | A1 * | 3/2008 | Inman et al. | 209/509 |
| 2008/0130946 | A1 * | 6/2008 | Wiersma | 382/101 |
| 2009/0048704 | A1 * | 2/2009 | Redford | 700/224 |
| 2009/0057207 | A1 * | 3/2009 | Orbke et al. | 209/584 |
| 2009/0159509 | A1 * | 6/2009 | Wojdyla et al. | 209/584 |
| 2010/0202655 | A1 * | 8/2010 | Stegeman et al. | 382/101 |

* cited by examiner

*Primary Examiner* — Chan Park
*Assistant Examiner* — Mia M Thomas
(74) *Attorney, Agent, or Firm* — Sughrue Mion, PLLC

(57) ABSTRACT

For preparing a series of mail pieces using a mail preparation apparatus, a scanner (63) scans at least a portion of a first postal item (20, 25) and generates signals in accordance with scanned patterns. A control system (31) processes the signals from the scanner into image data representing an image and compares the image data with reference data, which represent features of optical marks of a particular type that are associated to predetermined instructions for processing postal items (20, 25). If at least a predetermined extent of agreement between the image data and the reference data is found, a job setting including scanning of optical marks from further postal items (20, 25) and controlling the preparation of the mail pieces in accordance with instructions represented by the optical marks is selected. Otherwise, a job setting not including scanning of optical marks from further postal items (20, 25) is selected.

9 Claims, 1 Drawing Sheet

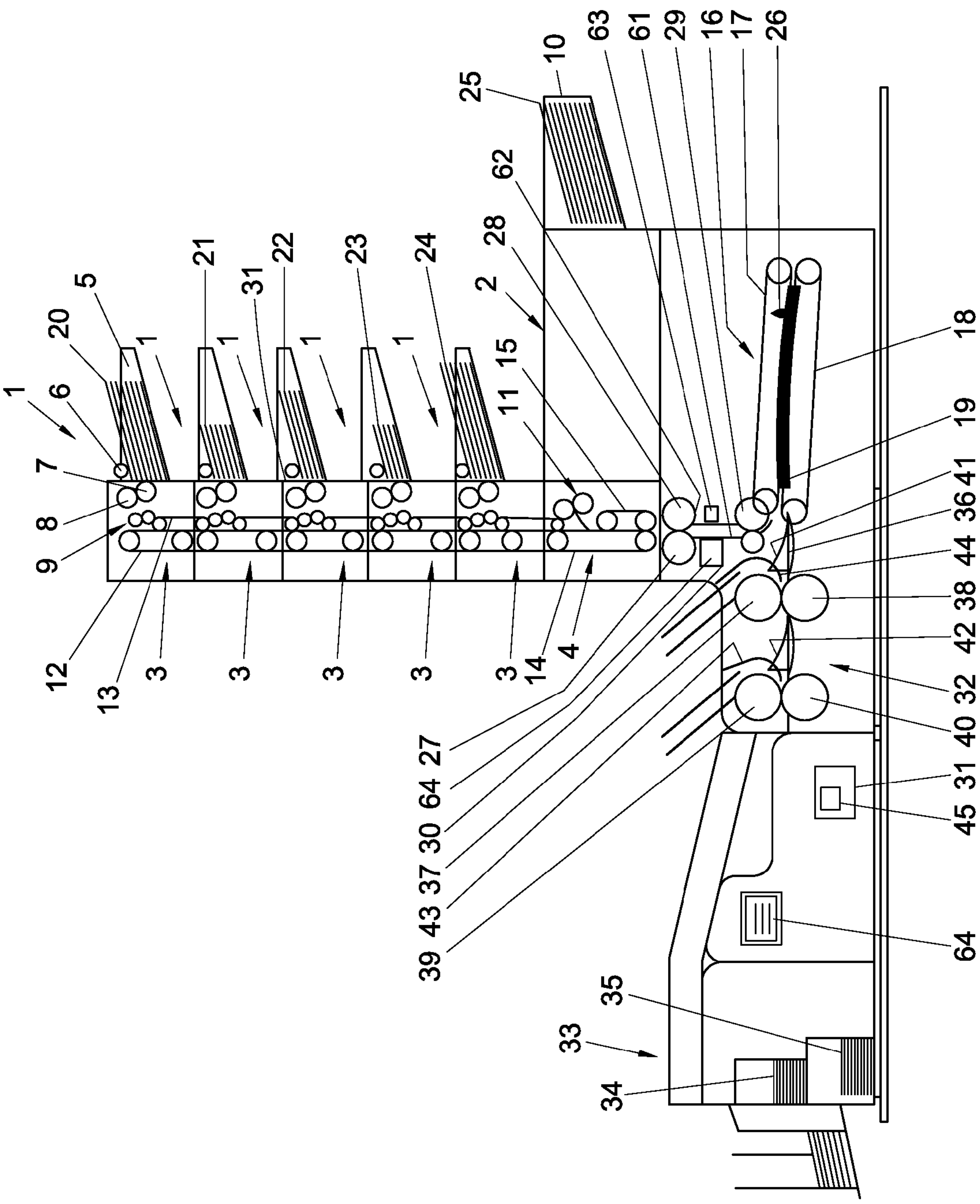
1
6
20
5
7
8
9
12
13
3
1
21
31
22
23
24
2
28
62
25
10
63
61
29
16
17
26
18
19
41
36
44
38
42
32
40
31
45
64
15
11
14
4
27
64
30
37
43
39
33
35
34

METHOD AND APPARATUS FOR PREPARING MAIL PIECES

FIELD AND BACKGROUND OF THE INVENTION

The invention relates to a method for preparing a series of mail pieces and to an apparatus for assembling mail pieces.

In order to assemble mail pieces with an apparatus, before starting a job in which a series of mail pieces is prepared, a job setting is inputted by selecting a number of settings or, for repeatedly occurring types of jobs, a combination of job settings stored in a memory is selected. The job settings include settings such as the type of documents, number of items of documents, way of folding, or feeding enclosures from feeding stations.

In European patent 0 556 922 it is disclosed to feed and scan a number of documents prior to starting a run. Data regarding these documents, such as length and identification, as obtained in scanning, can be stored. These data can subsequently be used in controlling the system, for instance for actuating selected feeder stations for feeding one or more documents contained therein, or for setting a folding station. In particular, it can be determined which insert documents are located in which feeder stations. These feeder stations can then be actuated, when assembling the mail items, depending on indicia on the main documents, which indicia indicate what insert documents are to be added. Accordingly, in that case, the system itself determines which feeder stations are to be actuated during that run in order for the correct insert documents to be added to a main document.

In European patent 1 084 978, it is disclosed to automatically determine whether a feeder station is to be brought into an operating condition or non-operating condition, depending on the detection, or non-detection, in a setting phase, in which of the feeder stations mail components are present. Subsequently, in an operating phase, exclusively feeder stations that are in operating condition are controlled for activation, Thus, exclusively those feeder stations in which mail components are present are brought into an operating condition, without the operator needing to determine which feeder stations are to be active or non-active.

Such automated self-setting of an apparatus increases the convenience for an operator. However, an operator still needs to specify whether, during a job, the processing of postal items is to be controlled in accordance with marks or other patterns read from postal items. In many cases it is also required that the operator inputs data defining how markings are to be processed.

SUMMARY OF THE INVENTION

It is an object of the present invention to provide a solution for obviating the need of inputting or selecting job settings defining the processing of indicia on postal items prior to the preparation of mail pieces including these postal items.

According to the invention, this object is achieved by providing a method for preparing a series of mail pieces using an apparatus for assembling mail pieces, the apparatus including a feeding station, a scanner for scanning postal items, a control system. The method includes: providing a stock of postal items to be mailed in a feeding station of the apparatus. The scanner scans at least a portion of a first one of the postal items and generates signals in accordance with scanned patterns on the postal item. The control system processes the signals from the scanner into image data representing an image of the scanned portion and compares the image data with one or more sets of reference data, which represent features of optical marks of a particular type. The optical marks are associated to predetermined instructions for processing postal items. In response to at least a predetermined extent of agreement between the image data and the set of reference data or at least one of the sets of reference data, the control system selects a job setting including scanning of optical marks from further postal items and controls the preparation of the mail pieces including the postal items in accordance with instructions represented by the optical marks. In response to absence of at least a predetermined extent of agreement between the image data and the set of reference data or at least one of the sets of reference data, the control system selects a job setting not including scanning of optical marks from further postal items and controls the preparation of the mail pieces including the postal items without scanning the further postal items for optical marks.

The invention can also be embodied in an apparatus for assembling mail pieces, having: at least one feeding station for holding a stock of postal items to be mailed, a scanner for scanning postal items and generating signals in accordance with scanned patterns on the postal item, a control system, a folding station, and an inserter station. The control system is arranged for processing the signals from the scanner into image data representing an image of at least a portion of a first one of the postal items scanned by the scanner and comparing the image data with one or more sets of reference data that represent features of optical marks of a particular type. The optical marks are associated to predetermined instructions for processing postal items. Furthermore, the control system of the apparatus is arranged for, in response to at least a predetermined extent of agreement between the image data and the set of reference data or at least one of the sets of reference data, selecting a job setting including scanning of optical marks from further postal items and controlling the preparation of the mail pieces including the postal items in accordance with instructions represented by the optical marks, and, in response to absence of at least a predetermined extent of agreement between the image data and the set of reference data or at least one of the sets of reference data, selecting a job setting not including scanning of optical marks from further postal items and controlling the preparation of the mail pieces including the postal items without scanning the further postal items for optical marks.

By comparing image data representing an image of a scanned portion of a first postal item with at least one set of reference data representing features of optical marks of a particular type, it is possible to automatically select either a job setting including scanning of optical marks from further postal items and controlling the preparation of the mail pieces in accordance with instructions represented by the optical marks or a job setting not including scanning of optical marks from further postal items and controlling the preparation of the mail pieces without scanning the further postal items for optical marks. This selection is made depending on the outcome of a determination whether at least a predetermined extent of agreement between the image data and the set of reference data or at least one of the set of reference data has been found.

Particular elaborations and embodiments of the invention are set forth in the dependent claims.

Further features, effects and details of the invention appear from the detailed description and the drawings.

BRIEF DESCRIPTION OF THE DRAWINGS

The drawing shows a schematic cut-away side elevational view of an example of a system according to the invention.

DETAILED DESCRIPTION

In the drawing, an apparatus is shown that is equipped with a plurality of feeding stations 1, 2 for delivering documents 20, 25, of which a bottom one is a printer 2. The first four feeding stations each are provided with a support 5 for receiving a stack of sheets, a supply roller 6, a separating roller 7, a transport roller 8 and a pair of feeding rollers 9. An example of a separating device suitable for use in a feeder according to the exemplary embodiment shown is described in more detail in applicants' U.S. Pat. No. 5,362,037.

The last feeding station, the printer, has a support 10 for receiving a stack of sheets to be printed and a pair of feeding rollers 11 for delivering a printed sheet at a suitable moment. Preferably, the printer 2 is of such design that the printing of a sheet is completed before the sheet reaches a waiting position between the feeding rollers 11.

The feeding stations 1, 2 are combined with conveyors 3, 4 to form feeding/transport units connectable to each other. The conveyors 3 connected with the feeder stations 1 comprise conveyor belts 12, 13 which are staggered relative to each other and are partly positioned opposite each other. Of these conveyor belts, the conveyor belt 13 located downstream of a transport unit located upstream extends to opposite a conveyor belt 12 or 14 located upstream of a next transport unit 3 or 4 located downstream. Consequently, a document can be passed on to a next transport unit 3 or 4. The last transport unit 4 comprises conveyor belts 14, 15 located opposite each other and ending directly opposite each other.

The system further comprises a gathering station 16 for gathering documents belonging to a given set to a stack having on one side substantially aligned document edges.

The gathering station 16 is designed as a head station having a supply track and a gathering surface 19 with a displaceable stop 26. The supply track is formed by transport rollers 27, 28, 29, 30 and guides 61, 62, and the gathering surface 19 is formed by a portion of a conveyor belt 18 passing over a support. Documents supplied by the transport unit 4 can be carried along this supply track to the gathering surface 19.

The documents can be transported in the direction of supply to opposite the stop 26 and then be discharged in the opposite direction. The aligned document edges then form the trailing edge of the stack, which is advantageous when folding the stack. That is, the place of each fold is determined relative to the trailing edge of the stack of documents.

The stop 26 is attached to the conveyor belt 18. The stop can be displaced by running the conveyor belt 18.

Arranged opposite the gathering surface 19 are pressing means 17 which are displaceable in the direction of the stop 26 approximately parallel to the gathering surface 19. The pressing means 17 can apply some pressure to the gathering surface 19 and have a greater coefficient of friction than does the gathering surface 19. By displacing the pressing means 17 in the direction of the stop 26 documents present between the gathering surface 19 and the pressing means 17 can be pressed against the stop 26 so that the document edges on the side of the stop 26 are aligned relative to each other.

The gathering surface 19 is convexly curved in the direction of movement of the stop 26. The pressing means 17 are designed as an endless belt 17 subjected to a given tension, one end of which belt extends along the gathering surface 19. As a result of the tension of the endless belt 17 of the pressing means this belt applies an evenly distributed pressure in the direction of the gathering surface 19 in an area contiguous to the stop 26.

The conveyor belt 17 has a greater coefficient of friction relative to the material of the documents than does the conveyor belt 18. By driving the conveyor belt 17 for applying a pressure to a document located between the belts 17 and 18 in the direction of the stop 26 this document will move over the belt 18 against the stop 26. A next document partly carried between the preceding document and the conveyor belt 17 will also move over the preceding document against the stop 26 when the belt 17 is driven in the direction of the stop 26. Successive documents can thus be aligned.

In the system according to the embodiment shown, the stop 26 can be removed from the gathering surface 19 by running the belt 18 until the stop 26 passes one of the end rollers thereof.

The system according to the invention further comprises a control system 31 for controlling the various stations of the system. The control system 31 is connected to the drives of the conveyor belts 12, 13, 14, 15, 17, 19 and rollers 6, 7, 8, 11, 27, 28, 29, 30.

The folding station 32 is provided with a first and a second pair of folding rollers 37, 38 and 39, 40, with the discharge track 36 passing between the folding rollers 37, 38 and 39, 40. Between the stop 26 and the folding rollers 37, 38 and 39, 40, respectively, deflectors 41 and 42 are arranged for deflecting the edge of a stack located remote from the stop 26. Opposite a folding nip between each pair of folding rollers 37, 38 and 39, 40, a folding knife 43, 44 is arranged for pressing a deflected portion of a document or a stack of documents into the folding nip.

After gathering of the documents the stack is first displaced counter to the direction of supply and then moved to the folding station 32 by shifting the stop 26. Thus, the edge of the stack remote from the stop 26 and a contiguous portion of the stack are deflected along a pair of folding rollers 37, 38 or 39, 40 and are clamped against the proximal folding roller 37 or 39 of this pair of folding rollers 37, 38 or 39, 40, whereafter the folding rollers are driven so that the deflected portion of the stack is bent further and is brought between the folding rollers, where a fold is provided in the stack.

Thus, the position of each fold can advantageously be determined by means of the position of the edge of the stack on the side of the stop 26.

A folding station and a folding method of the type as described above is for instance described in more detail in U.S. Pat. No. 5,090,671.

An inserter station 33 connects to the folding station 32. This inserter station 33 is equipped with two hoppers 34, 35 for envelopes. As a base for such an inserter station 33, the "in2" can be used, as produced and marketed by applicants. A method for selecting, depending on the documents to be packaged, an envelope hopper for delivering an envelope is for instance described in U.S. Pat. No. 5,339,603.

A feeding path of the system extends from the conveyors 3, 4, along the transport rollers 27, 28, 29, 30, and guides 61, 62 to the gathering surface 19, and then in opposite direction along the discharge track 36 and terminating at the inserter station 33.

When assembling a postal item using a system according to the exemplary embodiment shown, documents are delivered by the feeding stations 1, 2 to the transport units 3, 4. The documents are gathered by the gathering station 16 to form a stack having on one side substantially aligned document edges. This stack is supplied to the folding station 32 in a direction transverse to the above edges. Once folded, the stack is transported to the inserter station 33 and inserted in an envelope.

For scanning a postal item transported along the feeding path or a portion thereof, the system is provided with a scanner 63 downstream of the feeding stations 1, 2 and upstream of the gathering station 32. The scanner 63 is connected with the control system 31, which is arranged for controlling the various stations of the system in response to signals from the scanner 63 representing the scanned portion of the postal item.

The control system 31 is arranged for generating image data representing an image of a scanned portion of a postal item, from signals received from the scanner 63 scanning at least a portion of a first one of the postal items to be processed during a job. The control system 31 includes a memory 45 in which sets of reference data are stored that each represent one or more characteristics of a type of markings, such as OMR markings or one or two dimensional barcode (BCR) markings, which represent instructions for the processing of the scanned postal items and/or associated postal items. Also signals received from the scanner 63 and image data into which the signals received from the scanner 63 have been processed may be stored temporarily in the memory 45. The reference codes may include reference codes representing characteristics of types of markings that may include instructions for processing postal items in the course of preparing items to be mailed, but which the control system 31 cannot process. The control system 31 is preferably programmed for indicating that a program module for processing the scanned markings needs to be installed on the control system, with an indication of the type of markings for the processing of which the program module should be suitable or of the type of program module required.

The control system 31 is further arranged for comparing the image data with at least one set of the reference data in the memory 45. The control system 31 is further arranged for automatically selecting a job setting including the processing of the postal items in accordance with instructions represented by markings of the identified type, if the result of the comparison is that the features of optical marks of a particular type are found to be present in the pattern scanned from the first postal item.

Before starting the execution of a job, an operator loads a stock of items to be mailed one or more of the supports 5, 10 of the feeding stations 1, 2. When the system is activated it starts up in a setting phase wherein it detects which feeding stations are loaded and what type of envelopes are present. Then, still in the setting phase, a first postal item is fed from the feeding station 1, 2. When the postal item passes the scanner 63, a portion of the postal item is scanned and the control system 31 processes the signals received from the scanner 63 into image data representing an image of the scanned postal item. Next, the generated image data are compared with one or more of the sets of reference data in the memory 45. If markings are scanned from the document that have the characteristics of a reference code stored in the memory as processable by the control system, i.e. if there is at least a predetermined extent of agreement between the image data and one of the sets of reference data, the system selects a job setting that includes scanning of optical marks from the postal items and controlling the preparation of the mail pieces in accordance with instructions represented by the optical marks.

If such marks are not present, i.e. in absence of at least a predetermined extent of agreement between the image data and any of the sets of reference data, the system selects a job setting that does not include scanning of optical marks from further postal items and, hence, the preparation of the mail pieces is controlled without scanning the further postal items for optical marks. Moreover, in the latter case, the operator may be prompted to input job settings for processing features that would otherwise have been determined by the markings scanned from the documents, such as the stations from which inserts need to be fed and the number of main postal items per mail piece.

The scanning of the first postal item by the scanner 63 can be done line by line transverse to the direction of transport of the postal item, as in a copier or fax machine, resulting in the image data being generated likewise. This allows a pattern of e.g. dark pixels to be detected on a single scanned line and it can easily be checked if subsequent lines show a similar pattern on the same position—an indication of the presence of OMR markings with lines in a row transverse to the direction of transport. In order to distinguish a pattern of optical marks from other patterns, such as alphanumeric characters, graphs and illustrations, a minimum number of lines has to show the same pattern. The pattern may shift over a few pixels, 5-20, in the case of some skew of the postal item scanned. If a pattern is identified over several subsequent lines, this indicates the presence of optical marks, and it can be determined whether it concerns a pattern for OMR or BCR.

Marks intended for Optical Mark Reading are generally different for different brands of mail preparation apparatuses. Barcode, however, is defined and laid down in various ISO-certifications, such as ISO/IEC 15417—Code 128, ISO/IEC 15438—PDF417, or ISO/IEC 15420—EAN/UPC.

In the case of Barcode constituted by lines oriented in the direction of transport and forming a sequence transverse to the direction of transport, a number of consecutive stripes transverse to the direction of the scanning lines is present. The width of the space between these stripes and the width of the stripes themselves can have one of two fixed values, of which a first can be indicated as narrow compared to the second one and of which the second one can be indicated as wide compared to the first one. In special types of barcode, the first four stripes and spaces are of the same narrow width.

If the width varies over more values than the two fixed values of width, the optical marks cannot be identified as barcode and, consequently the optical marks may constitute OMR markings.

It is also possible to perform the comparison with the reference data set after the image data have been determined. This facilitates performing the comparison of the image data under a rotation of e.g. 90° for identifying optical marks on the postal items, which are oriented at a different orientation.

After it has been determined whether at least the predetermined extent of agreement between the image data and the set of reference data has been found and once the job settings are selected accordingly by the control system 31, the control system 31 can determine whether input of any other setting is required. If not, the preparation of the mail pieces is started automatically If one or more remaining settings is still to be inputted before the processing phase of a job can be started, the control system 31 defers clearance for the automatic start and controls a display 64 for displaying the remaining setting that is still to be inputted. After the operator has provided the input for the remaining settings, the control system 31 registers that the settings have been inputted and provides clearance for the automatic start.

When the control system 31 has determined that during the job, the postal items from at least one of the feeders 1, 2 are to be scanned and processed in accordance with scanned markings, the control system converts the signals representing the optical marks directly or indirectly (via image data) into processing instructions represented by the optical marks and the postal item are processed in accordance with these processing instructions. The size of the portion of the second and subsequent postal items that is scanned for optical marks can be reduced in accordance with the respective type of marks and the location and dimensions of the marks found on the first postal item. The scanning of a smaller portion than the portion scanned of the first postal item reduces the time needed for scanning and for converting of the signals from the scanner 63 into processing instructions.

While the invention has been illustrated and described in detail in the drawing and foregoing description, such illustration and description are to be considered illustrative or exemplary and not restrictive; the invention is not limited to the disclosed embodiments. For example, in response to at least a predetermined extent of agreement between the image data and the set of reference data, the scanning of the optical marks from the first and subsequent postal items may be done at a location downstream of the location where the first postal item has been scanned. In this manner the first postal item can be transported further through the machine, enabling the system to determine whether other necessary job settings are needed and that can be determined during the first run of the first postal item. Also, if a control system is capable of processing markings of one type only, the image scanned from the first postal item may be compared only with a single set of reference data containing features of that type of markings.

Other variations to the disclosed embodiments can be understood and effected by those skilled in the art in practicing the claimed invention, from a study of the drawings, the disclosure, and the appended claims.

The invention claimed is:

1. A method for preparing a series of mail pieces using an apparatus for assembling mail pieces, the apparatus comprising a feeding station, a scanner for scanning postal items and a control system, the method comprising:

providing a stock of postal items to be mailed in a feeding station of the apparatus;

the scanner scanning at least a portion of a first one of the postal items of said stock of postal items and generating signals in accordance with scanned patterns on the postal item;

the control system processing the signals from the scanner into image data representing an image of the scanned portion and comparing the image data with one or more sets of reference data, which represent features of optical marks, the optical marks being associated to predetermined instructions for processing postal items; and the control system, in response to at least a predetermined extent of agreement between the image data and the set of reference data or at least one of the sets of reference data, selecting a job setting including scanning of optical marks from further postal items of said stock of postal items and controlling the preparation of the mail pieces including said further postal items in accordance with instructions represented by the optical marks, whereas, in response to absence of at least a predetermined extent of agreement between the image data and the set of reference data or at least one of the sets of reference data, selecting a job setting not including scanning of optical marks from said further postal items and controlling the preparation of the mail pieces including said further postal items without scanning the further postal items for optical marks.

2. A method according to claim 1, wherein the preparation of the mail pieces is automatically started after it has been determined whether at least the predetermined extent of agreement between the image data and the set of reference data has been found.

3. A method according to claim 2, further comprising providing a display, wherein the automatic start of the preparation of the mail pieces is preceded by:

the control system determining whether at least one remaining setting is still to be inputted;

in response to a determination that at least one remaining setting is still to be inputted, the control system deferring clearance for the automatic start and controlling the display for displaying the at least one remaining setting that is still to be inputted; and the control system, in response to inputting the at least one remaining setting, registering that the at least one setting has been inputted and providing clearance for the automatic start.

4. A method according to claim 1, wherein, in response to detection of a stock of items in a feeding station of the apparatus, the scanning of at least a portion of a first one of the postal items of said stock of postal items, the generation of image data, the comparison of the image data with at least one set of reference data, and the selection of a job setting are started automatically.

5. A method according to claim 1, wherein, in response to at least a predetermined extent of agreement between the image data and the set of reference data or at least one of the set of reference data, the optical marks represented by the image data are converted into processing instructions represented by the optical marks and the first postal item is processed in accordance with said processing instructions.

6. A method according to claim 1, wherein, in response to at least a predetermined extent of agreement between the image data and the set of reference data or at least one of the sets of reference data, portions of the second and subsequent postal items from said stock of postal items are scanned, said portions being smaller than the first postal item or the scanned portion of the first postal items and each including the optical marks of the respective type.

7. A method according to claim 1, wherein, in response to at least a predetermined extent of agreement between the image data and the set of reference data or at least one of the sets of reference data, the optical marks are scanned from the first and subsequent postal items of said stock of postal items in a location downstream of the location where the first postal item has been scanned and processing instructions for the respective postal items are generated in accordance with the processing instructions represented by the optical marks.

8. A method according to claim 1, wherein the scanning is performed by line scanning along a plurality of lines and the comparison of the image data with the at least one set of reference data, comprises the steps of:

checking whether identical patterns are detected along a plurality of lines; and checking whether the patterns include alternations of tints or colours with repetitions of one or more pitches or spacings.

9. An apparatus for assembling mail pieces, comprising:

at least one feeding station for holding a stock of postal items to be mailed;

a scanner for scanning postal items and generating signals in accordance with scanned patterns on the postal items;

a control system;

a folding station; and an inserter station;

wherein the control system is arranged for:

processing the signals from the scanner into image data representing an image of at least a portion of a first one of the postal items of said stock of postal items scanned by the scanner;

comparing the image data with one or more sets of reference data that represent features of optical marks, the optical marks being associated to predetermined instructions for processing postal items;

in response to at least a predetermined extent of agreement between the image data and the set of reference data or at least one of the sets of reference data, selecting a job setting including scanning of optical marks from further postal items of said stock of postal items and controlling the preparation of the mail pieces including said further postal items in accordance with instructions represented by the optical marks; and in response to absence of at least a predetermined extent of agreement between the image data and the set of reference data or at least one of the sets of reference data, selecting a job setting not including scanning of optical marks from said further postal items and controlling the preparation of the mail pieces including said further postal items without scanning the further postal items for optical marks.

* * * * *